(12) United States Patent
Bai et al.

(10) Patent No.: US 9,779,850 B2
(45) Date of Patent: Oct. 3, 2017

(54) PROCESS FOR SYNTHESIZING CARBON NANOTUBES ON MULTIPLE SUPPORTS

(71) Applicants: CENTRE NATIONAL DE LA RECHERCHE SCIENTIFIQUE- CNRS-, Paris (FR); ÉCOLE CENTRALE DE PARIS, Châtenay-malabry (FR)

(72) Inventors: Jinbo Bai, Antony (FR); Anthony Dichiara, Antony (FR); Jinkai Yuan, Châtenay-malabry (FR)

(73) Assignees: CENTRE NATIONAL DE LA RECHERCHE SCIENTIFIQUE-CNRS, Paris (FR); CENTRALESUPELEC, Gif sur Yvette (FR)

( * ) Notice: Subject to any disclaimer, the term of this patent is extended or adjusted under 35 U.S.C. 154(b) by 615 days.

(21) Appl. No.: 14/363,826

(22) PCT Filed: Dec. 7, 2012

(86) PCT No.: PCT/FR2012/052840
§ 371 (c)(1),
(2) Date: Jun. 9, 2014

(87) PCT Pub. No.: WO2013/083931
PCT Pub. Date: Jun. 13, 2013

(65) Prior Publication Data
US 2014/0343210 A1 Nov. 20, 2014

(30) Foreign Application Priority Data
Dec. 8, 2011 (FR) ...................................... 11 61344

(51) Int. Cl.
| | |
|---|---|
| *C08G 64/00* | (2006.01) |
| *H01B 3/12* | (2006.01) |
| *C01B 31/02* | (2006.01) |
| *B82Y 30/00* | (2011.01) |
| *B82Y 40/00* | (2011.01) |
| *H01B 3/44* | (2006.01) |
| *C08G 63/02* | (2006.01) |

(52) U.S. Cl.
CPC ............... *H01B 3/12* (2013.01); *B82Y 30/00* (2013.01); *B82Y 40/00* (2013.01); *C01B 31/024* (2013.01); *C01B 31/0226* (2013.01); *C01B 31/0233* (2013.01); *H01B 3/445* (2013.01); *C01B 2202/22* (2013.01); *C01B 2202/26* (2013.01); *Y10S 977/742* (2013.01); *Y10T 428/292* (2015.01)

(58) Field of Classification Search
CPC ............... H01B 3/12; C01B 31/0226
USPC ................... 427/215; 428/368; 524/430, 495
See application file for complete search history.

(56) References Cited

FOREIGN PATENT DOCUMENTS

| WO | 2005075341 A1 | 8/2005 |
| WO | 2006005982 A1 | 1/2006 |
| WO | 2010066990 | 6/2010 |

OTHER PUBLICATIONS

Jin-Kai Yuan, "Fabrication and dielectric properties of advanced high permittivity polyaniline/poly(vinylidene fluoride) nanohybrid films with high energy storage density", Journal of Materials Chemistry, www.rsc.org/materials, 2010, 20, 2441-2447.
Wenjing Li, "Electric energy storage properties of poly (vinylidene fluoride)", Applied Physics Letters 96, 192905 (2010).
Q. M. Zhang, et al., "Giant Electrostriction and Relaxor Ferroelectric Behavior in Electron-Irradiated Poly(vinylidene fluoride-trifluoroethylene) Copolymer", Science 280, 2101 (1998); Downloaded from www.sciencemag.org on May 21, 2007.
International Search Report for corresponding application PCT/FR2012/052840 filed Dec. 7, 2012; Mail date Jun. 3, 2013.
Veedu V. P., et al., "Multifunctional composites using reinforced laminae with carbon-nanotubes forests", Nature Materials, Nature Publishing Group, vol. 5, Jun. 1, 2006, pp. 547-462, XP002500845.
Ci L., "Novel micro/nanoscale hybrid reinforcement: Multi-walled carbon nanotubes on SiC Particles", Advanced Materials, vol. 16, No. 22, Nov. 18, 2004, pp. 2021-2024, XP002678899.
Zhao Z-G, et al., "The growth of multi-walled carbon nanotubes with different morphologies on carbon fibers", Letters to the Editor, vol. 43, No. 3., Jan. 1, 2005, pp. 663-665, XP004694151.
Ci L. J., "Direct growth of carbon nanotubes on the surface of ceramic fibers", Letters to the Editor, Carbon 43, No. 4., Jan. 1, 2005, pp. 883-886, XP0047338900.

*Primary Examiner* — Terressa Boykin
(74) *Attorney, Agent, or Firm* — Cantor Colburn LLP

(57) ABSTRACT

The present invention relates to a process for synthesizing carbon nanotubes by continuous chemical vapor deposition at the surface of reinforcements, said reinforcements constituting a mixture A (i) of particles and/or fibers of a material comprising at least one oxygen atom and (ii) of particles and/or fibers of a material chosen from carbides and/or of a material comprising at least one silicon atom, said process comprising the following steps, carried out under a stream of inert gas(es) optionally as a mixture with hydrogen: (i) heating of said mixture of reinforcements A in a reaction chamber at a temperature ranging from 400° C. to 900° C.; (ii) introducing into said chamber a source of carbon consisting of acetylene and/or xylene, and a catalyst comprising ferrocene; (iii) exposing said heated mixture A to the source of carbon and to the catalyst comprising ferrocene for a sufficient time to obtain carbon nanotubes at the surface of the reinforcements constituting said mixture A; (iv) recovering a mixture B at the end of step (iii), optionally after a cooling step, said mixture B consisting of the mixture (A) of reinforcements comprising carbon nanotubes at their surface; (v) optionally, separation (a) of the particles and/or fibers of a material comprising at least one oxygen atom, (b) of the particles and/or fibers of a material chosen from carbides and/or of a material comprising at least one silicon atom.

17 Claims, 6 Drawing Sheets

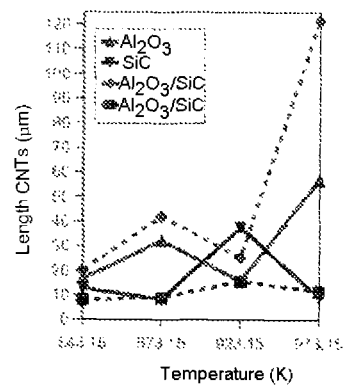
Fig.3
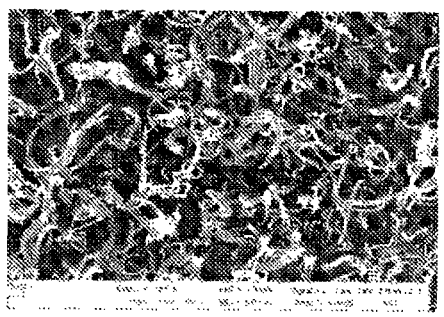 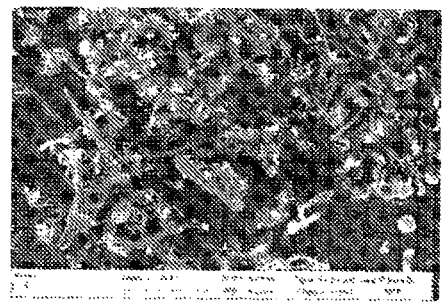
Fig.4  Fig.5

PROCESS FOR SYNTHESIZING CARBON NANOTUBES ON MULTIPLE SUPPORTS

TECHNICAL FIELD

The present invention relates to a process for the synthesis of carbon nanotubes at the surface of a material.

More specifically, a subject matter of the invention is a process for the synthesis of carbon nanotubes (abbreviation CNTs) by chemical vapor deposition (abbreviation CVD) at the surface of articles under a stream of inert gas(es) using (i) a carbon source comprising acetylene and/or xylene, and (ii) a ferrocene-comprising catalyst, said articles being provided in the form of a mixture A (i) of particles and/or fibers of a material comprising at least one oxygen atom and (ii) of particles and/or fibers of a material chosen from carbides and/or comprising at least one silicon atom.

The present invention also relates to the mixtures obtainable by this process, to the objects comprising such mixtures and to their uses in all the known fields of application of carbon nanotubes, in particular as reinforcement, for example in the preparation of structural and functional composite materials.

In the description below, the references in [ ] refer to the list of references presented at the end of the text.

BACKGROUND

Carbon nanotubes (CNTs) are arousing great interest in the field of research, both fundamental and applied, as their properties are exceptional in many respects. From a mechanical view point, CNTs exhibit both an excellent stiffness, comparable to that of steel, while being extremely light (6 times lighter than steel). CNTs also exhibit a good thermal and electrical conductivity. CNTs have already been proposed as reinforcements in composite materials.

Despite the highly advantageous properties of CNTs, to date, their use in reinforcing the structures of composite materials has proved to be not very satisfactory. This is because little or no improvement in the mechanical properties of the composite material, such as, for example, the tensile, flexural and compressive strength, stiffness and lifetime, lightening of the density, corrosion resistance, was obtained. Furthermore, the improvement in the electrical and/or thermal conduction properties was insufficient. This can be explained, for example, by the deterioration of the CNTs or of their properties during the dispersion of the CNTs, by the poor dispersion or alignment in the matrix of the composite material, by the high contact resistance between the CNTs and/or between the CNTs and their environment (matrix, substrates, and the like), by the addition of surfactants/dispersants, by an insufficient interface between the CNTs and the matrix, or by the use of a high content of CNTs.

One alternative consists in using conventional reinforcements, such as, for example, particles and fibers of silicon carbide (SiC), of alumina ($Al_2O_3$), of carbon fibers, and the like, at the surface of which carbon nanotubes (CNTs) are synthesized.

The document WO 2010/066990 describes in particular the synthesis of CNTs at the surface of reinforcements by using a carbon source consisting of xylene and acetylene and a ferrocene-comprising catalyst.

However, the growth, the density and the morphology of the CNTs are not very satisfactory and the weight yields are close to 10%.

There thus exists a real need for a process for the synthesis of CNTs at the surface of a material, in particular a material which can be used as reinforcement, for example in composite materials, which overcomes the failings, disadvantages and obstacles for the prior art, which can be carried out industrially and which is economically advantageous.

Furthermore, there exists a real need to have available a process for the synthesis of CNTs at the surface of a material, in particular a material which can be used as reinforcement, for example in composite materials:
  which can be suitable for the various types and geometries of materials/reinforcements to be treated (short fibers, long fibers, particles, and the like);
  which makes possible a homogeneity, in particular in diameter, in density and in arrangement of the deposited CNTs;
  which ensures good yields for the synthesis of the CNTs;
  which makes it possible to adjust the parameters of the process in order to adapt the homogeneity, the diameter and the density of the CNTs to the targeted application.
  the CVD synthesis temperature adapted to the nature of the materials/reinforcements to be treated.

It has thus been found, entirely surprisingly, that the fact of mixing first micrometric reinforcements in accordance with the invention and subsequently of bringing about the growth of CNTs by aerosol CVD on these same mixed reinforcements, in particular $Al_2O_3$ (alumina) and SiC (silicon carbide) microparticles, makes it possible to greatly improve the yield for the synthesis of the CNTs.

BRIEF SUMMARY

The present invention relates to a process for the synthesis of CNTs by CVD at the surface of articles, said articles being provided in the form of a mixture A (i) of particles and/or fibers of a material comprising at least one oxygen atom, advantageously $Al_2O_3$, and (ii) of particles and/or fibers of a material chosen from carbides and/or comprising at least one silicon atom, said process comprising the following steps, carried out under a stream of inert gas(es), optionally in mixture with hydrogen:
(i) heating, in a reaction chamber, said mixture A of articles at a temperature of between 400° C. and 900° C.;
(ii) introducing, into said chamber, a carbon source comprising acetylene and/or xylene and a ferrocene-comprising catalyst;
(iii) exposing said heated mixture A to said carbon source and to said ferrocene-comprising catalyst for a period of time sufficient to obtain CNTs at the surface of the articles forming said mixture A;
(iv) recovering a mixture B at the end of step (iii), optionally after a cooling step, said mixture B being formed of the mixture A of articles comprising CNTs at their surface;
(v) optionally separating the $Al_2O_3$ particles and/or fibers, comprising CNTs at their surface, from the particles and/or fibers of a material comprising at least one silicon atom, these particles and/or fibers comprising CNTs at their surface.

The process of the invention exhibits, inter alia, the advantage of optimizing the overall weight and chemical yields for the synthesis of CNTs with respect to the prior art. It also makes it possible to carry out the synthesis of nanotubes "continuously" when this is desired and at lower temperatures than the known processes and on materials on which the growth of CNTs is generally difficult to reproduce and/or difficult to be homogeneous in diameter of the CNTs and in density (number of CNTs per unit of surface area). It exhibits the advantage of being very particularly suitable for the mixtures, according to the invention, (i) of particles and/or fibers of a material comprising at least one oxygen atom, advantageously $Al_2O_2$, and (ii) of particles and/or fibers of a material chosen from carbides and/or comprising at least one silicon atom, whether the fibers are short, long or continuous.

These advantages, among others, render the process of the invention particularly advantageous, in particular industrially.

According to one embodiment of said process, the material chosen from carbides and/or comprising at least one silicon atom is chosen from silicon nitride ($Si_2N_4$), silicon carbide (SiC), silica ($SiO_2$), TiC and $B_4C$.

The invention also relates to a mixture (also known as mixture B) of (i) particles and/or fibers of a material comprising at least one oxygen atom, advantageously $Al_2O_2$, and of (ii) particles and/or fibers of a material chosen from carbides and/or comprising at least one silicon atom, said particles and/or fibers comprising CNTs at their surface, which are obtainable or obtained by a process as defined above.

Finally, the invention relates to the use of a mixture (also known as mixture B), as defined above, obtainable or obtained at the end of the process as defined above, as reinforcement for the preparation of structural and functional composite materials and/or as (di)electric material and/or in the field of electrical engineering, microelectronics or telecommunications and/or as reinforcement in the preparation of paints and varnishes.

The term "nanotube" is understood to mean, within the meaning of the present invention, a carbon-based tubular structure which has a diameter of between 0.5 and 100 nm. These compounds belong to the family referred to as "nanostructured materials", which exhibit at least one characteristic dimension of the order of a nanometer.

In the context of the invention, the terms "to synthesize", "to deposit" or also "to bring about the growth" can be used to denote the same phenomenon, namely to synthesize CNTs which grow directly at the surface of the material/reinforcer.

In the context of the invention, the term "composite material" is understood to mean a material composed of at least two constituents. One is "the matrix", which provides the composite with cohesion. The other is "the reinforcer" or "the reinforcement", which provides the composite with physical and mechanical qualities/properties which are more advantageous than with the matrix alone.

In the context of the present invention, the terms "material", "reinforcer" or "material/reinforcer" are used without distinction to denote a material comprising at least one oxygen atom, for example $Al_2O_3$, and a material chosen from carbides and/or comprising at least one silicon atom, such as, for example, silicon nitride ($Si_3N_4$), silicon carbide (SiC), silica ($SiO_2$), TiC and $B_4C$, it being possible for said materials to be used to provide, for example, the composite materials with physical and mechanical properties, such as, for example, the tensile, flexural and compressive strength, stiffness and lifetime, frictional and wear resistance, lightening of the density, corrosion resistance, electrical and thermal conductivity and shielding of electromagnetic waves.

In the context of the invention, a fiber is described as "long or continuous" when its length is equal to or greater than 20 cm and a fiber is "short" when its length is less than 20 cm. The process can be similar when it concerns synthesizing CNTs at the surface of particles and short fibers.

Within the meaning of the present description, the term "specific surface" refers to the BET specific surface, as determined by nitrogen adsorption, according to the well known "Brunauer-Emmett-Teller" method, which is described in The Journal of the American Chemical Society, volume 60, page 309, 1938, and which corresponds to the international standard ISO 5794/1.

The invention will now be described in more detail.

The improved characteristics of the process of the invention, namely increase in the weight yield, increase in the diameter of the CNTs and increase in the density of the CNTs, can be explained by the use of the specific combination: acetylene, xylene, ferrocene and mixture (i) of particles and/or fibers of $Al_2O_2$ and (ii) of particles and/or fibers of a material comprising at least one silicon atom.

The present invention employs a mixture A (i) of solid or hollow particles of a material comprising at least one oxygen atom, advantageously $Al_2O_2$, and/or of fibers of a material comprising at least one oxygen atom, advantageously $Al_2O_2$, and (ii) of hollow or solid particles of a material chosen from carbides and/or comprising at least one silicon atom and/or fibers of a material chosen from carbides and/or comprising at least one silicon atom. Advantageously, the material comprising at least one silicon atom is chosen from silicon nitride ($Si_3N_4$), silicon carbide (SiC) and silica ($SiO_2$) and the carbide is chosen from TiC and $B_4C$.

The ratio by weight of the mixture A of (particles and/or fibers of a material comprising at least one oxygen atom, advantageously $Al_2O_2$)/(particles and/or fibers of a material chosen from carbides and/or comprising at least one silicon atom) can be between 10/90 and 90/10, advantageously between 25/75 and 75/25, better still between 40/60 and 60/40.

When fibers are concerned, these fibers can have a diameter of 1 to 100 μm, advantageously of 4 to 50 μm. When particles are concerned, these particles can have a diameter of 0.1 to 100 μm, advantageously of 0.2 to 40 μm.

Advantageously, the mixture A is a mixture of $Al_2O_2$ particles and of silicon carbide (SiC) particles.

The catalyst can be composed exclusively of ferrocene. It can also comprise ferrocene, optionally in mixture with another catalyst chosen from the organometallic group comprising phthalocyanine and iron pentacarbonyl.

According to one embodiment, when 0.1 to 0.5 g of mixture A are employed, the introduction is carried out of 0.01 to 0.3 g/ml of ferrocene in xylene and/or acetylene.

The xylene/ferrocene flow rate can be from 0.05 to 0.5 ml/min (advantageously 0.2 ml/min) and the acetylene flow rate can be from 0.01 to 0.1 l/min (advantageously 0.04 l/min).

The reaction chamber can be any device which makes possible simultaneous and controlled introduction of the chemical precursors, provided with at least one furnace with a system for circulation of the gases and with at least one gas and liquid flow meter which makes it possible to measure and to control the flow rates of the gases and liquids. An example of a device which may be suitable for the implementation of the process of the invention is shown in FIG. 12.

According to one embodiment of said process, the heating temperature of step (i) is between 400 and 900° C., advantageously between 650 and 900° C., if a good yield is targeted, or between 400 and 550° C., if a low synthesis/treatment temperature is necessary.

In the case of temperatures for the synthesis of CNTs which are less than 600° C., the deposition of CNTs is carried out slowly on the particles and/or the fibers of the mixture A. This is because, under these conditions, no carbon-based deposit is observed either on the quartz tube or on the quartz plate supporting the mixture A.

In step (ii), the acetylene can be introduced into the reaction chamber in the gas form in an amount of greater than 0% and ranging up to 20% by volume of the total gas with a linear velocity of $5.0 \times 10^{-6}$ to $1.0 \times 10^{-1}$ m/s. It can also be introduced, for example, in an amount ranging from 0.1% to 10% by volume of the total gas.

The term "linear velocity" is understood to mean the distance travelled by the acetylene in 1 second. The linear velocity is determined as a function of the flow rate of the acetylene and of the volume of the reaction chamber. For example, for a tube with an internal diameter of 45 mm, a gas flow rate at 1 l/min corresponds to a linear velocity of 0.0095 m/s. This is true for all the gases used in the context of the present invention.

In step (ii), the xylene is introduced into the reaction chamber in the liquid form, optionally in mixture with the ferrocene. When the ferrocene is introduced by vaporization, the xylene is introduced alone. The system used for the introduction of xylene, alone or in mixture with the ferrocene, can be any system which makes possible its injection, for example an atomizer, a vaporizer, a nebulizer or an air spray.

The flow rate of the xylene, alone or in mixture with the ferrocene, can be between 5 and 40 ml/h or 0.05 and 0.5 ml/min, for example between 10 and 25 ml/h for a CVD tube with a diameter of approximately 45 mm.

According to one embodiment, in step (ii), the xylene can be introduced into the reaction chamber in the form of microdroplets via a spray, optionally mixed with the ferrocene, the flow rate of liquid being controlled at 0.2 ml/min, or the flow rate of xylene being controlled from 0.1 to 0.7 ml/min.

One advantage of an independent introduction of the ferrocene and of the carbon source is the possibility of choosing the moment for the introduction of one with respect to the other, whereas the control of the ratio is possible via the concentration of the solution. According to a specific embodiment of the invention, the xylene is introduced in a liquid form in mixture with the ferrocene. This makes it possible to introduce an advantageous technical solution for introducing the ferrocene, by dissolving it in the liquid xylene, for a synthesis in the presence of acetylene.

The ferrocene content of this mixture can be between 0.001 and 0.3 g of ferrocene/ml of xylene, for example between 0.001 and 0.2 g of ferrocene/ml of xylene, more particularly between 0.01 and 0.1 g of ferrocene/ml of xylene.

As indicated above, in step (ii), the ferrocene can also be introduced alone into the chamber. In this case, prior to its introduction, the ferrocene is vaporized and it is the ferrocene vapor which is introduced into the reaction chamber, for example via a stream of gas, for example of argon, optionally in mixture with hydrogen.

In step (iii), the mixture A can subsequently be exposed to the carbon source and to the catalyst for a period of time of 1 to 120 minutes. This period of time can also be from 5 to 90 minutes, for example from 5 to 30 minutes. A person skilled in the art will know how to adjust this period of time according to, on the one hand, the desired size and the desired density of the CNTs and, on the other hand the material and the risk of decomposition of said material during the treatment.

In step (iv), the mixture B obtained at the end of step (iii), which comprises particles and/or fibers comprising CNTs at their surface, can be recovered (i) without preliminary cooling, for example at the outlet of the reactor when the synthesis is "continuous", or (ii) after cooling to a temperature of, for example, 15 to 100° C.

At the end of step (iv), the material comprising CNTs at its surface can be used as is in the various applications envisaged.

All the steps (i) to (iv) can be carried out under a stream of inert gas(es), optionally in mixture with hydrogen, with a hydrogen/inert gas(es) ratio of 0/100 to 50/50, for example of 0/100 to 40/60. The inert gases can be chosen from the group comprising helium, neon, argon, nitrogen and crypton. The implementation of the preceding provisions makes it possible, by controlling the growth of the CNTs at the surface of the material/reinforcer, to improve in particular the interface properties between the CNTs and the reinforcers and the properties of the composites by providing good dispersion of the CNTs in the matrix.

The process of the synthesis of the CNTs according to the invention has the advantage of being able to be carried out continuously.

The term "continuous synthesis process" is understood to mean a process in which the introduction of the material/reinforcers, at the surface of which the CNTs are to be synthesized, does not require halting the equipment or interrupting the production. A continuous process is particularly advantageous in the case where the material to be treated is a long fiber as defined above or in the case of particles/short fibers with a conveyor or a fluidized bed.

The mixture B of particles and/or fibers according to the invention comprising CNTs at their surface, which is obtained or obtainable by a process according to the invention, can be in the form of short fibers (with a length of less than 20 cm), in the form of long or continuous fibers (with a length equal to or greater than 20 cm) and/or in the form of particles. Said particles and/or fibers obtained according to the process of the invention have CNTs at their surface, this being the case with a good and reproducible homogeneity in diameter and in density (expressed in particular as number of CNTs per microm$^2$). Thus, the number of CNTs per microm$^2$ at the surface of said particles and/or fibers can be between 5 and 200 per microm$^2$, for example between 30 and 60 per microm$^2$.

Generally, the mixture B of the invention exhibits a rise in weight, due to the deposition of the CNTs, of between 0.2% and 80%, with respect to the weight of the starting material.

When the mixture B of the invention is exclusively in the form of fibers, the rise in weight is more particularly between 0.2% and 10%, for example between 0.5% and 5%, with respect to the weight of the starting mixture A.

When the mixture B of the invention is exclusively in the form of particles, the rise in weight is more particularly of between 5% and 50%, for example between 10% and 40%, with respect to the weight of the starting mixture A.

The particles and/or fibers in accordance with the invention can also exhibit a specific surface of greater than 150 m$^2$/g, for example of between 150 and 2000 m$^2$/g, for example between 200 and 1000 m$^2$/g.

The mixture B according to the present invention of (i) particles and/or fibers of a material comprising at least one oxygen atom, advantageously $Al_2O_3$, said particles and/or fibers comprising CNTs at their surface, and of (ii) particles and/or fibers of a material chosen from carbides and/or of a material comprising at least one silicon atom, said particles and/or fibers comprising CNTs at their surface, can be used in all the applications where such materials/reinforcers are employed. They are more particularly used as reinforcers in the preparation of composite materials, in particular in fields where their electrical properties are desired and/or in fields where their mechanical properties are desired and/or in fields where their thermal properties are desired. According to one embodiment, the mixture according to the invention additionally comprises a polymer, a metal or a composite material.

The composite materials comprising mixtures B according to the invention can be intended, for example, for the motor vehicle industry, for the aeronautical and space industry, for the construction industry, for the textile industry, for sports equipment or also for electronic equipment. In addition, they can be used in the preparation of high performance fabrics or clothing. They can also be used in the preparation of electrochemical components, in particular of an electrode having a high surface area, for the better corrosion resistance thereof.

They can make it possible to obtain the specific structure of filtration and/or decontaminating materials, in particular for air, wastewater or gases at high temperature.

Due to its high specific surface, the material according to the invention can be used in the preparation of catalyst supports, for example for heterogeneous catalysis.

Finally, when the material of the invention is not in the form of a long fiber as defined above, it can be used as reinforcer in the preparation of paints and varnishes.

The process according to the invention makes it possible not only to significantly increase the effectiveness of the growth of CNTs on microparticles or microfibers by aerosol CVD for the purpose of industrial applications but also brings about a saving in time and the use of lower temperatures in the preparation of hybrid nano/micro reinforcers for applications in composite materials. The use of these hybrid nano/micro as reinforcers makes it possible to greatly improve the properties of various composite materials, for example dielectric or conductive materials.

Other advantages might yet become apparent to a person skilled in the art on reading the examples below, illustrated by the appended figures, given by way of illustration.

BRIEF DESCRIPTION OF THE FIGURES

FIG. 3 represents the length of the CNTs as a function of the temperature for substrates not in accordance with the invention (substrate SiC alone or $Al_2O_3$ alone) and for substrates in accordance with the invention.

FIGS. 4 and 5 represent photographs taken with a scanning electron microscope respectively (i) of a mixture of microparticles, with mean diameters of between 3 and 7 micrometers, of $Al_2O_3$ and SiC (50/50) and (i) of $Al_2O_3$ microparticles alone after having carried out the process of the synthesis of the CNTs according to the invention at a temperature of 700° C.

DETAILED DESCRIPTION AND EXAMPLES

It should be remembered that the conversion of degrees Celsius into degrees Kelvin is K=° C.+273.15 and of degrees Kelvin into degrees Celsius is ° C.=K−273.15.

Example 1: Preparation of Mixture of Materials Covered with CNTs

1/Assembly Used

The assembly (FIG. 12) is made up so as to control the simultaneous injections of the chemical precursors and the flow rates of gases into a reactor of the quartz tube type, the heating of which is provided by a resistance thermal furnace sold by Carbolite equipped with a temperature programmer.

The flow rate of gases (acetylene ($C_2H_2$), argon (Ar), hydrogen ($H_2$)) are measured and controlled by digital mass flow meters sold by Bronkhorst France and Serv Instrumentation.

The flow rates of liquid precursors (xylene, xylene/ferrocene mixture) are controlled with a mechanism of medical syringe driver type (sold by Razel or by Fisher Bioblock Scientific) or mixer equipped with a liquid flow meter (sold be Bronkhorst France and Serv Instrumentation).

The ferrocene is injected dissolved in the xylene or else directly vaporized and injected by convection by means of a neutral carrier gas, such as, for example, argon, by virtue of an appropriate device.

In the examples, when the ferrocene is directly vaporized, the vaporization is carried out in a glass vaporization chamber (heated 100 ml three-necked round-bottomed flask sold by Fisher Bioblock); the vaporization temperature is between 200 and 400° C.; the carrier gas is argon with a flow rate of 0.1 to 0.4 l/min. More generally, for the vaporization of the ferrocene, a device external to the reactor or reaction chamber makes it possible to heat the ferrocene in order to vaporize it. The vapor is then injected by convection: a stream of neutral gas sweeps across the vaporization chamber.

For a given temperature, the amount of ferrocene vaporized is proportional to the flow rate of the neutral gas. By taking into account the vapor pressure of the ferrocene in the vaporization chamber (P expressed in mmHg), the amount of ferrocene can be calculated by the relationship:

Log $P$(mmHg)=7.615-2470/$T$(° K).

The mixtures A used are mixtures of spherical alumina ($\mu$-$Al_2O_3$, with a purity of 99.8%, comprising 800 ppm of $SiO_2$ and 600 ppm of $Na_2O$) microparticles and of silicon carbide microparticles having a mean size of between 3 and 7 $\mu$m. These particles are sold by Performance Ceramics.

2/Synthesis of CNTs by Aerosol CVD on Alumina ($Al_2O_3$) and/or SiC Particles

Figure 12:
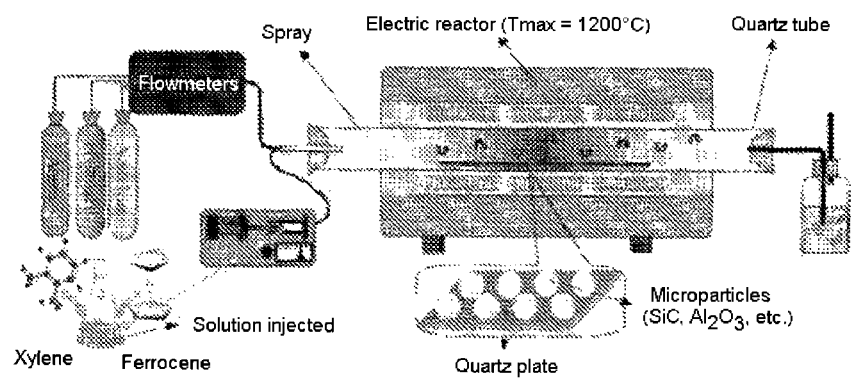
FIG. 12 represents a device for the synthesis of the CNTs in accordance with the invention.

The assembly used is that of FIG. 12. The synthesis of the CNTs was carried out on mixtures in accordance with the invention of alumina and SiC particles defined above and on alumina particles alone defined above or SiC particles alone defined above, by way of comparatives.

The operating conditions are as follows:
flow rate of gases=$H_2$ 0.3 l/min, Ar 0.7 l/min, $C_2H_2$ 0.04 l/min,
concentration of ferrocene in xylene: 0.05 g/ml and liquid flow rate at 12 ml/h,
time=10 min, temperature=575° C.

The device employed for carrying out this synthesis is composed of a cylindrical quartz chamber, with a length of 110 cm and a diameter of 45 mm, heated between 500 and 900° C. by a horizontal furnace with a length of 60 cm. The microparticles, which have not been subjected to any pretreatment, are mixed and then homogeneously deposited for a given weight on a quartz plate having a length of approximately fifteen cm. The combination is then placed in the tube at the center of the furnace and brought to temperature under an inert atmosphere (mixture of argon and hydrogen). The total flow rate of the gases present in the reactor is kept constant at 1 l/min using electronic flow meters of Brook Smart type. A solution of ferrocene (Fe($C_5H_5$)$_2$) diluted in xylene ($C_8H_{10}$), the concentration of which is variable from 0.01 to 0.3 g/ml, will act both as catalytic precursors (iron) and carbon source. This solution is subsequently injected in the spray form into the tube using an electronic syringe driver, the flow rate of which can be adjusted manually. Finally, another hydrocarbon, the acetylene ($C_2H_2$), is also injected into the system at controlled flow rates from 0.01 to 0.1 l/min. The growth of nanotubes lasts between 5 and 50 min for each sample. In order to finish, the system is cooled to ambient temperature under an inert atmosphere (argon) in order to collect the samples.

3/Results 3.1. Yields

The overall weight and chemical yields were calculated. The calculation is carried out according to the equations below.

The overall weight yield refers to the ratio of the weight of nanotubes synthesized to the total weight of the hybrids produced (nanotubes+microparticles), such that:

$$Y_{weight} = \frac{\text{weight nanotubes}}{\text{total weight hybrids (nanotubes + microparticles)}}$$

The overall chemical yield is the degree of conversion of the reactants introduced into the device (acetylene, ferrocene and xylene) to give synthesized products (carbon-based and metal products). The formula for this degree of conversion is as follows:

$$Y_{chem} = \frac{\text{total weight products}}{\text{total weight reactants}} \times 100$$

Although the phenomenon observed is reproducible over a broad temperature range (from 400 to 900° C.), the weight and chemical yields were calculated for different mixtures of microparticles having an SiC/$Al_2O_3$ weight ratio of 1/0 (comparative), 7/3, 5/5, 3/7 and 0/1 (comparative) under the same conditions of synthesis at 600° C.

Figure 1:
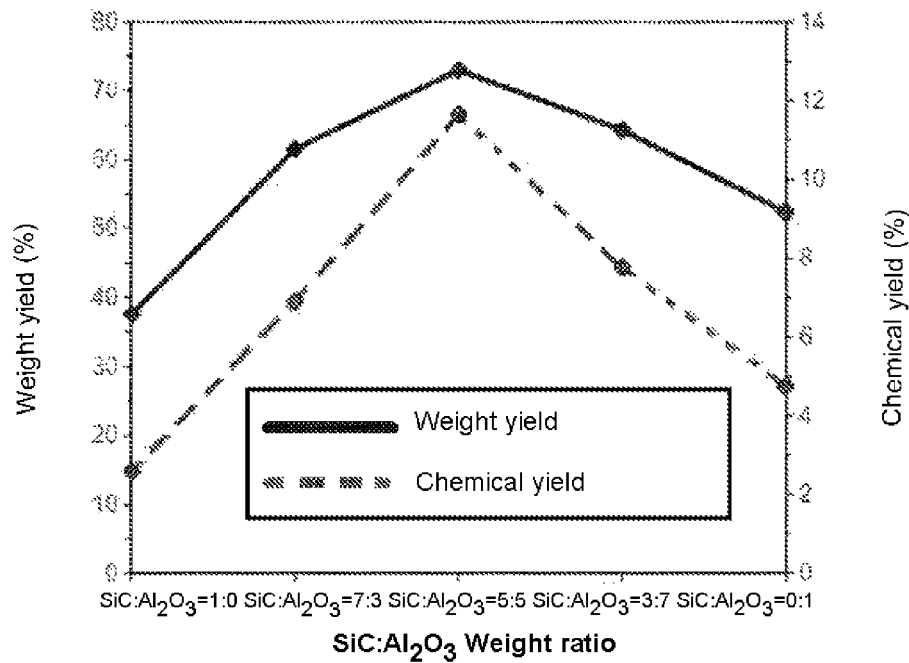
FIG. 1 represents the overall weight and chemical yields of syntheses of CNTs carried out under the same conditions at 600° C. for different mixtures of $Al_2O_3$ (purity 99.8%, comprising 800 ppm of $SiO_2$ and 600 ppm of $Na_2O$) microparticles and of SiC microparticles, said microparticles having a mean diameter between 3 and 7 micrometers.
Figure 2:
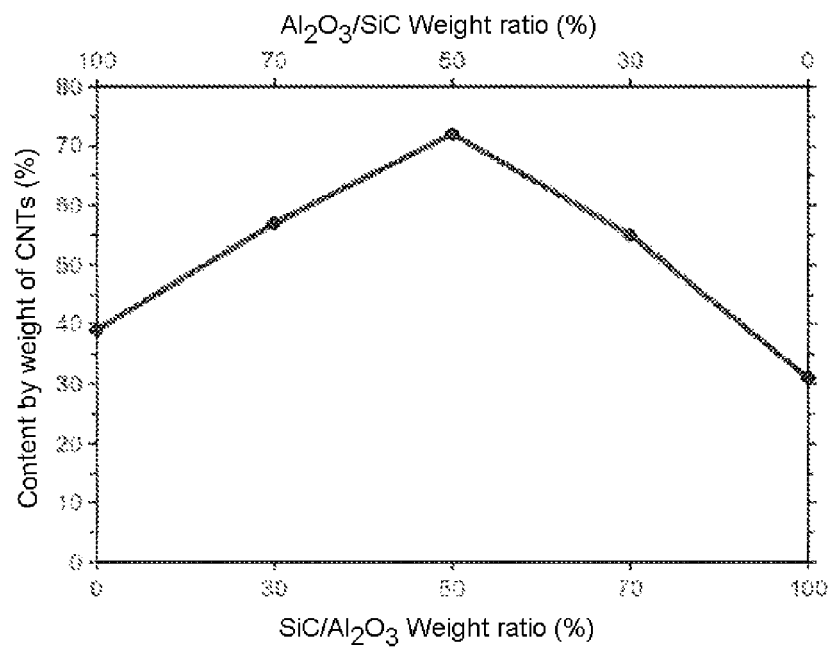
FIG. 2 represents the weight percentage of CNTs in the mixtures of $Al_2O_3$ (purity 99.8%, comprising 800 ppm of $SiO_2$ and 600 ppm of $Na_2O$) microparticles and of SiC microparticles, said microparticles having a mean diameter between 3 and 7 micrometers, as a function of the percentage of $SiC/Al_2O_3$.

The results, set out in FIG. 1, have formed the subject of a mean carried out on two series of syntheses which are identical, for the sake of reproducibility.

It is noticed first of all that the values for overall chemical yield are relatively low, in view of the fact that not all the aerosol is completely consumed during the reaction and that a portion is re-encountered in the traps of the reactor outlet. Nevertheless, these values have a tendency to increase with the temperature since more aerosol may then be consumed. Thus, if these data are compared with literature results obtained under similar aerosol CVD conditions but on other substrates, it is noted that, for processes optimized at higher temperatures, the overall chemical yields do not exceed 8% (2% at 800° C., 7.8% at 850° C. and 4.6% at 900° C.).

In addition, a significant increase in the overall weight yield is noticed when the alumina and silicon carbide microparticulate substrates are mixed, with respect to the comparatives, the SiC/$Al_2O_3$ weight ratio of which is 1/0 or 0/1.

Specifically, the weight yield has virtually doubled, with respect to the comparatives, whereas the chemical yield has for its part virtually tripled!

Generally, a main increase in the weight yield of greater than 25% is obtained, with respect to the substrates for which the SiC/$Al_2O_3$ weight ratio is 1/0 or 0/1, whatever the CVD conditions employed.

3.2. Length of the CNTs

If the growth of CNTs on a substrate for which the SiC/$Al_2O_3$ weight ratio is 0/1 is compared with the growth of the CNTs on substrates comprising a mixture of alumina and silicon carbide particles, it is found that the nanotubes synthesized on a substrate comprising a mixture of alumina and silicon carbide particles are overall longer than those synthesized on alumina alone. The nanotubes having grown on the alumina portion of the alumina/silicon carbide mixture are on average 20 µm longer than those having grown on a substrate composed solely of alumina microparticles, under identical CVD synthesis conditions. The addition of SiC particles thus has a synergistic effect favorable to the growth of CNTs on alumina since it makes it possible to increase the rate of growth of the CNTs on alumina by approximately 72% under the conditions of synthesis according to the invention.

FIG. 3 below shows us the change in the length of the nanotubes as a function of the temperature for different substrates under consideration with the comparatives (substrate composed solely of alumina microparticles and substrate composed solely of silicon carbide microparticles) in solid lines and the mixtures B according to the invention in dotted lines.

The SEM images of FIGS. 4 and 5, on the same scale and taken at the end of a process for the synthesis of CNTs under the same operating conditions (700° C.), make it possible to display the difference in growth of the nanotubes for a 50/50 mixture of alumina/SiC particles in accordance with the invention, in the case of FIG. 4, and for a substrate of alumina microparticles not in accordance with the invention, in the case of FIG. 5.

3.3. Diameter of the CNTs

An increase in the diameter of the nanotubes is observed when the substrates are substrates comprising a mixture of alumina and silicon carbide particles, with respect to the mean diameter of the CNTs when the substrate is composed of alumina particles or of SiC particles.

Figure 6:
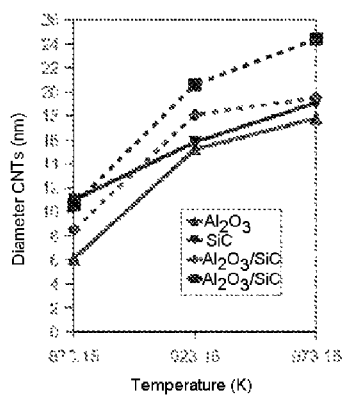
FIG. 6 represents the diameter of the CNTs as a function of the temperature for substrates not in accordance with the invention (substrate SiC alone or $Al_2O_3$ alone) and for substrates in accordance with the invention.

The diameter is thus greater on average by 18% with regard to the alumina particles and by 21% with regard to the silicon carbide particles in a mixture B according to the invention, compared respectively with the mean diameter of CNTs on a substrate composed solely of alumina particles and on a substrate composed solely of SiC particles. Furthermore, FIG. 6 shows that this increase is significant over the whole of the temperature range considered.

Figure 7:
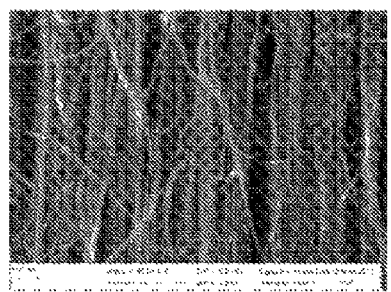
FIGS. 7 and 8 represent photographs taken with a scanning electron microscope respectively (i) of a mixture of microparticles, with mean diameters of between 3 and 7 micrometers, of $Al_2O_3$ and SiC (50/50) and (i) of $Al_2O_3$ microparticles alone after having carried out the process for the synthesis of the CNTs according to the invention at a temperature of 650° C.
Figure 8:
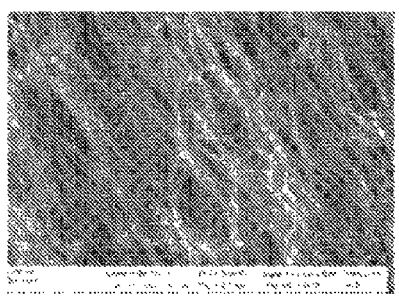

The SEM images of FIGS. 7 and 8, on the same scale and taken at the end of a process for the synthesis of CNTs under the same operating conditions (650° C.), make it possible to display the difference in diameters of the nanotubes for a 50/50 mixture of alumina/SiC particles in accordance with the invention, in the case of FIG. 7, and for a substrate of alumina microparticles not in accordance with the invention, in the case of FIG. 8.

3.4. Density of the CNTs

In order to calculate the surface density of nanotubes for the samples, the mean density per unit length over 1 µm of length of CNTs was first determined and then this density per unit length was subsequently squared. Thus, it is noticed that the mean density of CNTs on mixed SiC and alumina particles respectively increases by 43% and by 18% when the substrates are mixed and in accordance with the invention, in comparison with respectively (i) the mean density of CNTs on a substrate composed solely of SiC particles and (ii) the mean density of CNTs on a substrate composed solely of alumina particles.

Figure 9:
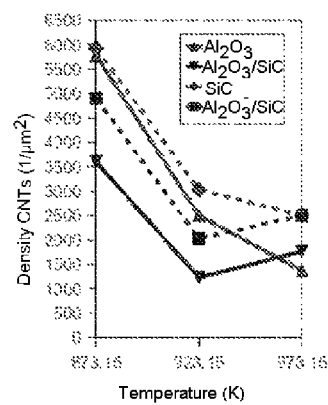
FIG. 9 represents the density of the CNTs as a function of the temperature for substrates not in accordance with the invention (substrate SiC alone or $Al_2O_2$ alone) and for substrates in accordance with the invention.

Furthermore, FIG. 9 shows that this increase in density is generally greater for SiC than for alumina, this being the case over the whole of the temperature range considered.

Figure 10:
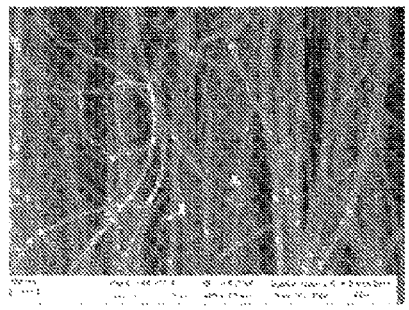
FIGS. 10 and 11 represent photographs taken with a scanning electron microscope respectively (i) of a mixture of microparticles, with mean diameters of between 3 and 7 micrometers, of $Al_2O_2$ and SiC (50/50) and (i) of SiC microparticles alone after having carried out the process for the synthesis of the CNTs according to the invention at a temperature of 650° C.
Figure 11:
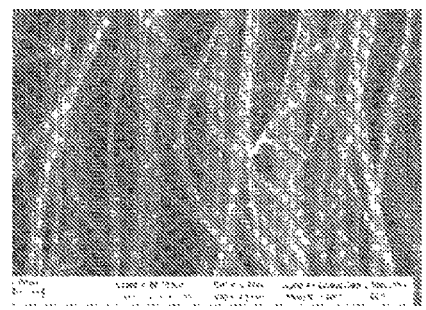

The SEM images of FIGS. 10 and 11, on the same scale and taken at the end of a process for the synthesis of CNTs under the same operating conditions (650° C.), make it possible to display the difference in density of the nanotubes for a 50/50 mixture of alumina/SiC particles in accordance with the invention, in the case of FIG. 10, and for a substrate of silicon carbide microparticles not in accordance with the invention, in the case of FIG. 11.

4/Conclusion of Example 1

The simultaneous growth of CNTs on two types of different and mixed substrates chosen from alumina fibers, alumina particles, the fibers of material comprising at least one silicon atom and the particles of a material comprising at least one silicon atom (for example, a mixture of alumina and silicon carbide microparticles) exhibits significant beneficial effects on:

(i) the yield of the process for growth of CNTs by aerosol CVD (Mean increase in the weight yield, whatever the conditions of synthesis, of greater than 25%);

(ii) the diameter of the CNTs (Mean increase of approximately 20%);

(iii) the length of the CNTs (CNTs approximately 20 µm longer on average on alumina and 5 µm shorter on average on SiC);

(iv) the rate of growth (Increase of 72% on average in the rate of growth of the CNTs on alumina) and;

(v) the density of the CNTs (Increase of 43% on average in the density of the CNTs on silicon carbide and of 18% on average on alumina).

There is thus a true synergistic effect of the two substrates which makes it possible to obtain all these advantages. In addition to its undeniable advantage over the processes for the syntheses of CNTs in a large amount, the present invention also confers a significant benefit on the preparation of novel composite materials which may be used for various types of applications.

Example 2: Preparation of Dielectric Composite Materials

Compositions comprising (i) a mixture of particles covered with CNTs (5 different mixtures are tested) according to the invention and a PVDF polymer were prepared by employing an extrusion method which makes it possible to provide a uniform dispersion of the mixture of particles covered with CNTs in said polymer. First of all, the mixture of particles covered with CNTs, prepared as defined above, and the PVDF powder are dispersed in N,N-dimethylformamide (abbreviation DMF). The resulting mixture is subsequently treated by magnetic stirring overnight so as to obtain a precursor composite solution.

The precursor composite solution obtained above is subsequently applied to ceramic particles which are subsequently heat treated at 150° C. for 2 h.

Subsequently, the resulting composite particles are again mixed in a corotating, conical, twin-screw microcompounder (Micro 5 $cm^3$, twin-screw compounder, DSM) at 200° C. for more than 10 minutes and at a stirring rate of 20 rev/min under an argon atmosphere. 5 samples of composite particles are thus obtained, the initial composition of the mixture of particles covered with CNTs of which is different and defined in table 1 below. The dielectric permittivity, AC conductivity and tangential loss properties are expressed respectively in FIGS. 13, 14 and 15 as a function of the silicon carbide particles/alumina particles ratio of the starting mixture, said particles being covered with CNTs.

Blocks with a thickness of 1.5 mm were prepared by injection molding of composites (Micro 5 $cm^3$ Injection Molder, DSM) using a pressure of 1.6 MPa for 1 minute, while the temperature of the mold was maintained at 60° C. The temperature is then decreased from 60° C. down to ambient temperature.

Figure 13:
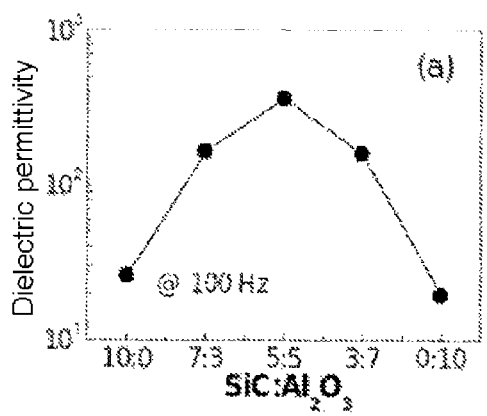
FIG. 13 represents the dielectric permittivity of a composite having a PVDF matrix reinforced by hybrid fillers ($Al_2O_2$+SiC) as a function of the $Al_2O_2$/SiC ratio of the mixtures of $Al_2O_2$ (purity 99.8%, comprising 800 ppm of $SiO_2$ and 600 ppm of $Na_2O$) microparticles and of SiC microparticles, said microparticles having a mean diameter between 3 and 7 micrometers.
Figure 14:
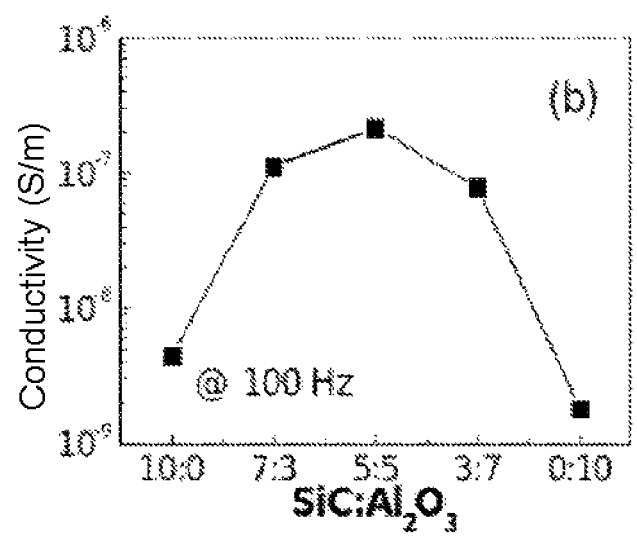
FIG. 14 represents the AC conductivity of a composite having a PVDF matrix reinforced by hybrid fillers ($Al_2O_2$+SiC) as a function of the $Al_2O_2$/SiC ratio of the mixtures of $Al_2O_2$ (purity 99.8%, comprising 800 ppm of $SiO_2$ and 600 ppm of $Na_2O$) microparticles and of SiC microparticles, said microparticles having a mean diameter between 3 and 7 micrometers.
Figure 15:
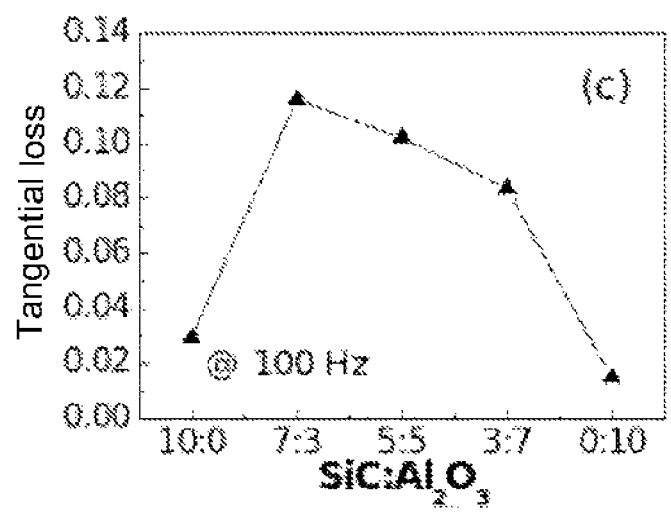
FIG. 15 represents the tangential loss as a function of a composite having a PVDF matrix reinforced by hybrid fillers ($Al_2O_2$+SiC) related to the $Al_2O_2$/SiC ratio of the mixtures of $Al_2O_2$ (purity 99.8%, comprising 800 ppm of $SiO_2$ and 600 ppm of $Na_2O$) microparticles and of SiC microparticles, said microparticles having a mean diameter between 3 and 7 micrometers.

The characteristics of each sample 1-5 produced are given in table 1 below. The results are illustrated in FIGS. 13-15.

TABLE 1

| Sample | SiC/Al$_2$O$_3$ ratio | Amount of the mixture of SiC/Al$_2$O$_3$ particles | Amount of ceramic (g) | Amount of CNTs (g) | Amount of PVDF (g) |
|---|---|---|---|---|---|
| 1 | 10/0 | 0.080 | 0.05 | 0.030 | 5.00 |
| 2 | 7/3 | 0.130 | 0.05 | 0.080 | 5.00 |
| 3 | 5/5 | 0.185 | 0.05 | 0.135 | 5.00 |
| 4 | 3/7 | 0.140 | 0.05 | 0.090 | 5.00 |
| 5 | 0/10 | 0.105 | 0.05 | 0.055 | 5.00 |

The invention claimed is:

1. A process for the synthesis of carbon nanotubes (abbreviation CNTs) by chemical vapor deposition (abbreviation CVD) at the surface of articles, said articles being provided in the form of a mixture A (i) of particles and/or fibers of a material comprising at least one oxygen atom and (ii) of particles and/or fibers of a material chosen from carbides and/or of a material comprising at least one silicon atom, said process comprising the following steps, carried out under a stream of inert gas(es), optionally in mixture with hydrogen:
   (i) heating, in a reaction chamber, said mixture A of articles at a temperature of between 400° C. and 900° C.;
   (ii) introducing, into said chamber, a carbon source comprising acetylene and/or xylene and a ferrocene-comprising catalyst;
   (iii) exposing said heated mixture A to said carbon source and to said ferrocene-comprising catalyst for a period of time sufficient to obtain CNTs at the surface of the articles forming said mixture A;
   (iv) recovering a mixture B at the end of step (iii), optionally after a cooling step, said mixture B being formed of the mixture A of articles comprising CNTs at their surface;
   (v) optionally separating the particles and/or fibers of a material comprising at least one oxygen atom, said particles and/or fibers comprising CNTs at their surface, from the particles and/or fibers of a material chosen from carbides and/or comprising at least one silicon atom, said particles and/or fibers comprising CNTs at their surface.

2. The process according to claim 1, in which the material chosen from carbides and/or comprising at least one silicon atom is chosen from silicon nitride (Si$_3$N$_4$), silicon carbide (SiC), silica (SiO$_2$), TiC and B$_4$C and/or in which the material comprising at least one oxygen atom is Al$_2$O$_3$.

3. The process according to claim 1, in which the ratio by weight of the mixture A of (particles and/or fibers of a material comprising at least one oxygen atom)/(particles and/or fibers of a material chosen from carbides and/or comprising at least one silicon atom) is between 10/90 and 90/10.

4. The process according to claim 1, in which the heating temperature of step (i) is between 650 and 900° C. or between 400 and 550° C.

5. The process according to claim 1, in which the material in step (i) is provided in the form of fibers having a diameter of 1 to 100 μm or of particles having a diameter of 0.1 to 100 μm.

6. The process according to claim 1, in which, in step (ii), the acetylene is introduced into the reaction chamber in the gas form in an amount of greater than 0% and ranging up to 20% by volume of the total gas with a linear velocity of $5.0 \times 10^{-6}$ to $1.0 \times 10^{-1}$ m/s.

7. The process according to claim 1, in which, in step (ii), the xylene is introduced into the reaction chamber in the form of microdroplets via a spray, optionally mixed with the ferrocene, the flow rate of xylene being controlled from 0.1 to 0.7 ml/min.

8. The process according to claim 7, in which the ferrocene content of the xylene and ferrocene mixture is between 0.001 and 0.3 g of ferrocene/ml of xylene.

9. The process according to claim 1, in which, in step (iii), the mixture A is exposed to the carbon source and to the catalyst for a period of time of 1 to 120 minutes.

10. The process according to claim 1, in which steps (i) to (iv) are carried out under a stream of inert gas(es), optionally in mixture with hydrogen, with a hydrogen/inert gas(es) ratio of 0/100 to 50/50.

11. A mixture (i) of particles and/or fibers of a material comprising at least one oxygen atom, advantageously Al$_2$O$_3$, and (ii) of particles and/or fibers of a material chosen from carbides and/or comprising at least one silicon atom, said particles and/or fibers comprising CNTs at their surface, said mixture being obtained or obtainable by a process according to claim 1.

12. The mixture according to claim 11, having a rise in weight of between 0.2% and 80%, with respect to the weight of the starting material.

13. The mixture according to claim 11, in which the number of CNTs at the surface of the material is between 5 and 200 per microm$^2$.

14. The mixture according to claim 11, exhibiting a specific surface of between 150 and 2000 m$^2$/g.

15. The mixture according to claim 11, additionally comprising a polymer, a metal or a ceramic material.

16. An object comprising a mixture according to claim 11 or comprising a mixture obtainable at the end of the process according to claim 1.

17. A process for preparing reinforced structural and functional composite materials comprising the step of adding (i) a mixture according to claim 11, or (ii) particles and/or fibers of a material comprising at least one oxygen atom, advantageously Al$_2$O$_3$, said particles and/or fibers comprising CNTs at their surface, or (iii) particles and/or fibers of a material chosen from carbides, said particles and/or fibers comprising CNTs at their surface, or (iv) particles and/or fibers of a material comprising at least one silicon atom, said particles and/or fibers comprising CNTs at their surface, and said fibers and/or particles of (ii)-(iv) being obtainable at the end of the process according to claim 1, during the process for preparing reinforced structural and functional composite materials.

* * * * *